US012697626B2

(12) United States Patent
Luukkonen et al.

(10) Patent No.: US 12,697,626 B2
(45) Date of Patent: Aug. 4, 2026

(54) ROTOR OF GAS DISPERSION ARRANGEMENT

(71) Applicant: METSO FINLAND OY, Espoo (FI)

(72) Inventors: Matti Luukkonen, Tampere (FI); Timo Hamalainen, Tampere (FI)

(73) Assignee: Metso Finland Oy, Espoo (FI)

( * ) Notice: Subject to any disclaimer, the term of this patent is extended or adjusted under 35 U.S.C. 154(b) by 311 days.

(21) Appl. No.: 18/562,682

(22) PCT Filed: May 27, 2022

(86) PCT No.: PCT/FI2022/050368

§ 371 (c)(1),
(2) Date: Nov. 20, 2023

(87) PCT Pub. No.: WO2022/248774

PCT Pub. Date: Dec. 1, 2022

(65) Prior Publication Data

US 2024/0261800 A1 Aug. 8, 2024

(30) Foreign Application Priority Data

May 28, 2021 (EP) .................................... 21176490

(51) Int. Cl.
*B03D 1/20* (2006.01)
*B01F 23/23* (2022.01)
(Continued)

(52) U.S. Cl.
CPC ............ *B03D 1/20* (2013.01); *B01F 23/2331* (2022.01); *B03D 1/1493* (2013.01); *B01F 33/4021* (2022.01)

(58) Field of Classification Search
CPC .............................. B01F 23/2331; B03D 1/20
See application file for complete search history.

(56) References Cited

U.S. PATENT DOCUMENTS 3,485,484 A 12/1969 Quinchon
3,765,656 A 10/1973 Tofaute
(Continued)

FOREIGN PATENT DOCUMENTS

CN 1638873 A 7/2005
CN 102811819 A 12/2012
(Continued)

OTHER PUBLICATIONS

International Search Report and Written Opinion for International Patent Application No. PCT/FI2022/050368, mailed Aug. 11, 2022.
(Continued)

*Primary Examiner* — Robert A Hopkins
(74) *Attorney, Agent, or Firm* — Andrus Intellectual Property Law, LLP

(57) ABSTRACT

A rotor of a gas dispersion arrangement, including a cover disc, air slots arranged to protrude away from the cover disc, the air slots defining an interior space in the interior of the rotor, an air channel connected to the air slot for supplying air to be dispensed in slurry, and slurry slots arranged between and an alternating way with the air slots around the interior space. The slurry slots are in fluid communication with the interior space, and radially extending blades are arranged for separating the air slot from adjacent slurry slots. The cover disc includes at least one through-hole extending from an upper surface of the cover disc to at least one of the slurry slots.

17 Claims, 2 Drawing Sheets

(51) Int. Cl.

| | |
|---|---|
| ***B01F 23/233*** | (2022.01) |
| ***B03D 1/14*** | (2006.01) |
| *B01F 33/40* | (2022.01) |

(56) References Cited

U.S. PATENT DOCUMENTS

| | | | | |
|---|---|---|---|---|
| 3,875,279 | A | | 4/1975 | Kaelin |
| 5,244,097 | A | * | 9/1993 | Leiponen ............ B01F 23/2331 210/221.1 |
| 6,394,430 | B1 | | 5/2002 | Forschner et al. |
| 6,805,243 | B1 | | 10/2004 | Kallioinen et al. |
| 2004/0112799 | A1 | | 6/2004 | Niitti |
| 2008/0063523 | A1 | | 3/2008 | Niiti |
| 2014/0001103 | A1 | | 1/2014 | Yoon et al. |

FOREIGN PATENT DOCUMENTS

| | | | |
|---|---|---|---|
| CN | 105658335 | A | 6/2016 |
| CN | 219291666 | U | 7/2023 |
| DE | 3635642 | A1 | 4/1988 |
| WO | 2003026800 | A2 | 4/2003 |
| WO | 2006037843 | A1 | 4/2006 |
| WO | 2008062097 | A1 | 5/2008 |
| WO | 2021084430 | A1 | 5/2021 |

OTHER PUBLICATIONS

Extended European Search Report for European Patent Application No. 21176490.7, dated Nov. 18, 2021.

Search Report for corresponding Chinese Patent Application No. 202210592240X, mailed Jan. 30, 2026.

* cited by examiner

ROTOR OF GAS DISPERSION ARRANGEMENT

CROSS-REFERENCE TO RELATED APPLICATIONS

This application is the U.S. national stage application of International Application PCT/FI2022/050368, filed May 27, 2022, which international application was published on Dec. 1, 2022, as International Publication WO 2022/248774 A1 in the English language. The International Application claims priority of European Patent Application No. 21176490.7, filed May 28, 2021.

BACKGROUND

The invention relates to a rotor of a gas dispersion arrangement, such as a flotation cell.

Gas dispersion arrangements, such as flotation cells, may be used for e.g. recovering valuable ingredients, such as metal concentrates from a slurry. Air is needed in a flotation cell for creating a froth bed. Typically, the air is fed to a rotor through a duct arranged to the shaft of the rotor. When rotating the rotor, air is fed into the slurry, and air bubbles are dispersed therein. Air bubbles flow upwards and enter the surface of the slurry where they form the froth bed. Particles containing valuable ingredients may flow upwards with the air bubbles and enter in the froth bed. Alternatively, valueless ingredients flow upwards with the air bubbles and enter in the froth bed, and the valuable ingredients remains non-flotated.

Although the known rotors are result of vigorous research and development work, there are still needs for even more effective rotors in the field of gas dispersion arrangements.

BRIEF DESCRIPTION

Viewed from a first aspect, there can be provided a rotor of a gas dispersion arrangement, comprising a cover disc, air slots arranged to protrude away from the cover disc, the air slots defining an interior space in the interior of the rotor, an air channel connected to the air slot for supplying air to be dispensed in slurry, slurry slots arranged between and in an alternating way with the air slots around the interior space, the slurry slots being in fluid communication with the interior space, radially extending blades arranged for separating the air slot from adjacent slurry slots, wherein the cover disc comprises at least one through-hole extending from an upper surface of the cover disc to at least one of the slurry slots.

Thereby a rotor of a gas dispersion arrangement utilizing downflow in a flotation cell and providing increased rotor pumping performance may be achieved.

The rotor is characterised by what is stated in the independent claim. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment, the through-hole has a shape of a polygon, such as quadrangle.

An advantage is that the through-hole or its side wall may create a pumping effect, i.e. act as a blade, and push slurry towards the slurry slot, thereby further increasing rotor pumping performance.

In one embodiment, the through-hole comprises at least one side edge on the upper surface that makes a hole angle with radial direction of the rotor, wherein said hole angle is in range of −10°-+45°.

An advantage is that an increased rotor pumping performance may be provided, and blockage of the through-hole may be prevented.

In one embodiment, an outmost wall of the through-hole makes an outer diameter angle with direction of the centre axis, wherein said angle is in range of −10°-+60°.

An advantage is that an increased rotor pumping performance may be provided, and blockage of the through-hole may be prevented.

In one embodiment, an innermost wall of the through-hole makes an inner diameter angle with direction of the centre axis, wherein said angle is in range of −10°-+60°.

An advantage is that an increased rotor pumping performance may be provided, and blockage of the through-hole may be prevented.

In one embodiment, at least one side wall of the through-hole makes a side wall angle with direction of the centre axis, wherein said angle is in range of −20°-+60°.

An advantage is that an increased rotor pumping performance may be provided, and blockage of the through-hole may be prevented.

In one embodiment, total area of the through-holes in relation to the area of the cover disc is in range of 2%-40%, such as 20%-30%.

An advantage is that an increased rotor pumping performance may be provided.

In one embodiment, area of the through-hole in relation to the cross-sectional area of the corresponding slurry slot is in range of 2%-40%, such as 20%-30%.

An advantage is that an enhanced rotor pumping performance may be provided.

In one embodiment, the upper surface of the cover disc comprises at least one top blade, arranged at least mainly radially.

An advantage is that downwards flow of slurry through the through-holes may be increased.

In one embodiment, the length of the top blade is selected in range from 0.5× the length of the corresponding through-hole in radial direction on the upper surface of the cover disc to a length equal to the radius of the upper surface.

An advantage is that an enhanced rotor pumping performance may be provided, and back flow through the through-hole may be prevented.

In one embodiment, the height of the top blade in relation to the height of the rotor measured from the bottom thereof to the underside of the cover disc is selected in range of 1%-50%.

An advantage is that an enhanced rotor pumping performance may be provided, and back flow through the through-hole may be prevented.

In one embodiment, the upper surface of the cover disc is provided with an outer ring that has a height extending away from said upper surface.

An advantage is that slurry flow directed in the through-holes may be enhanced, and back flow through the through-hole may be prevented.

In one embodiment, the bottom surface of the air channel is inclined in relation to the plane of the cover disc in an inclination angle selected in range of 0°-60°, such as 5°-30°.

An advantage is that blockages of the air channel may be prevented.

In one embodiment, the length of the air channel in relation to the diameter (D) of the cover disc is selected in range of 10%-30%, such as 20%.

An advantage is that blockages of the air channel may be prevented.

In one embodiment, the shape of the air slot has a curved shape without any points of discontinuity.

An advantage is that blockages of the air slots and channels by slurry may be reduced.

In one embodiment, the center air void whereto the air channels are in fluid communication has designed and dimensioned such that the cross sectional area of all the air channels is at least substantially equal with the cross sectional area of an inlet receiving air in the rotor.

An advantage is that a fluent flow of air into the air slots may be achieved.

In one embodiment, the shape of the slurry slot has an optimized shape so that its cross-sectional shape is at least substantially triangular in smaller rotors, and at least substantially rectangular in larger rotors.

An advantage is that an advantageous flow pattern in the slurry slot may be achieved.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
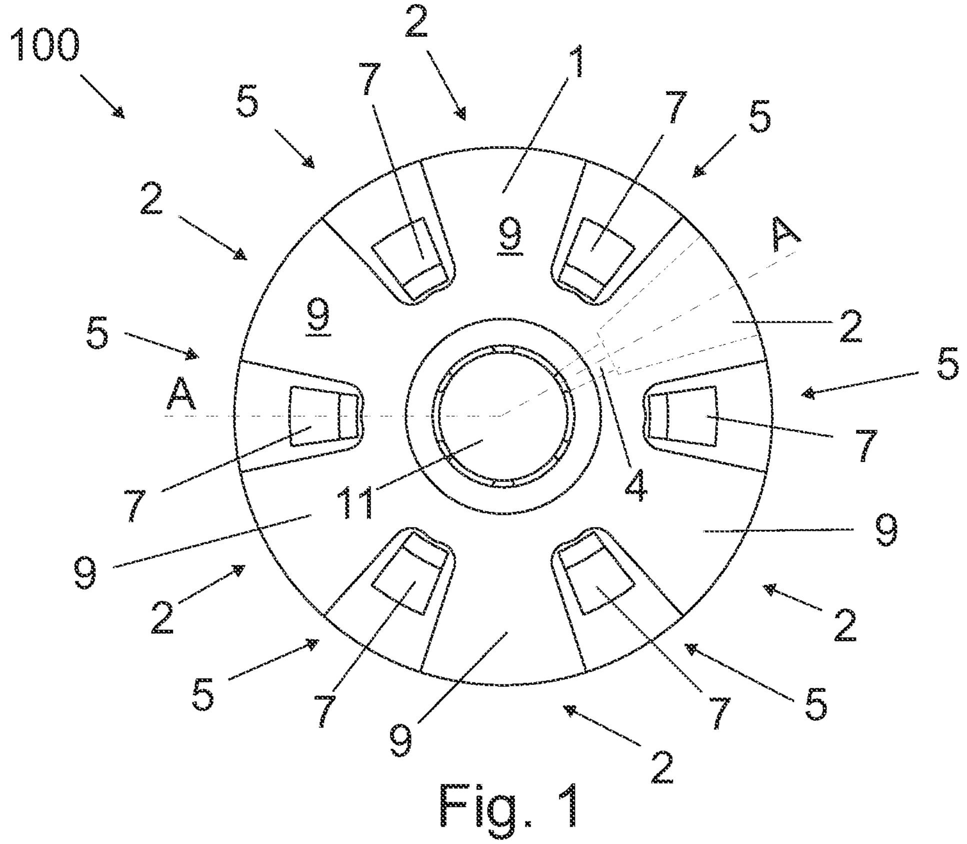
FIG. 1 is a schematic top view of a rotor.
Figure 2:
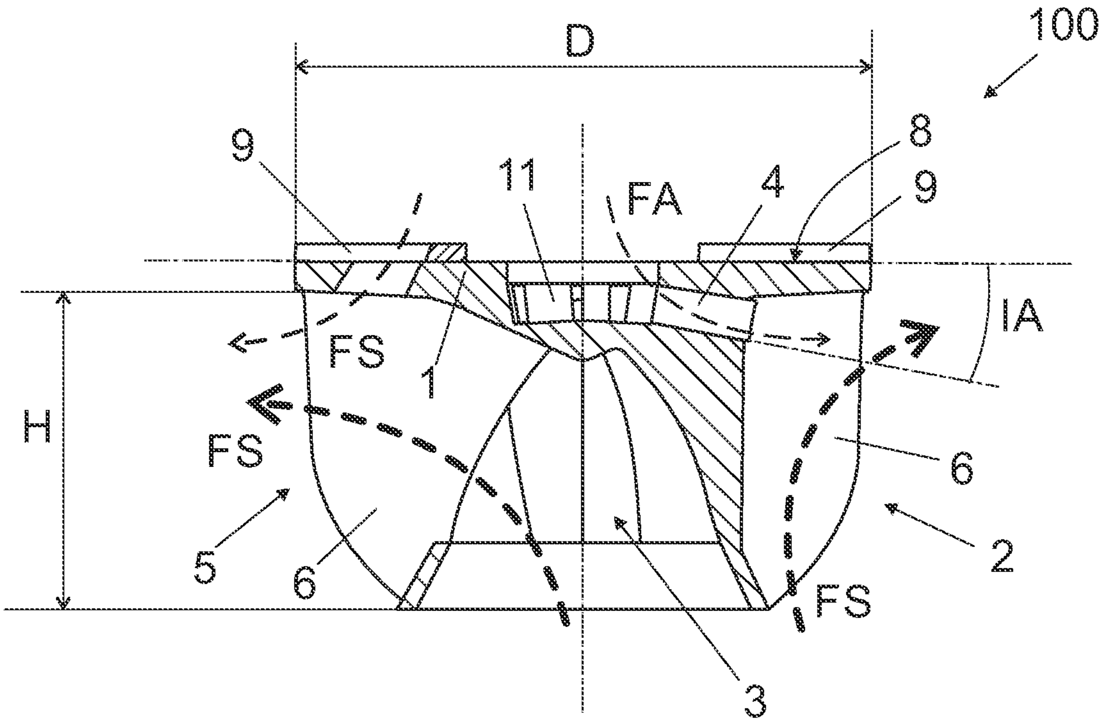
FIG. 2 is a schematic side view of the rotor shown in FIG. 1 in partial cross-section.

FIG. 1 is a schematic top view of a rotor, and FIG. 2 is a schematic side view of the rotor shown in FIG. 1 in partial cross-section along a line A-A shown in FIG. 1.

The rotor 100 is a rotor of a flotation machine, particularly used for dispersing air to a slurry. The rotor 100 can be arranged in e.g. a flotation cell. According to an aspect, the flotation cell may be used for e.g. recovering valuable ingredients from slurry, such as slurry that contains minerals. According to another aspect, the flotation cell may be used in oil industry.

The rotor 100 can be arranged in e.g. a reactor tank wherein it is attached to a rotor shaft (not shown) that rotates the rotor around a centre axis X. When rotating, the rotor 100 sets the slurry fed into the flotation cell in motion and disperses air into the slurry, whereupon air bubbles are dispersed in the slurry. Air bubbles flow upwards and enter the surface of the slurry. In one embodiment, said air bubbles are participating in forming a froth bed on the surface of the slurry. However, in another embodiment there is no froth bed on the surface of the slurry.

The rotor 100 comprises a cover disc 1, the basic shape of which is preferably round.

Plurality of air slots 2 are arranged to protrude away from the cover disc 1. In the embodiment shown in Figures, there are six air slots in the rotor. It is to be noted, however, that the number of air slots may be less than six or more than six, such as two (2) to fifteen (15), preferably four (4) to seven (7).

The air slots 2 define an interior space 3 in the interior of the rotor.

An air channel 4 is connected to the air slot 2 for supplying air therein. In one embodiment, another end of the air channel 4 is connected to a center air void 11 for supplying air from said void to the air slot 2.

The rotor 100 comprises slurry slots 5 arranged between and an alternating way with the air slots 2 around the interior space 3. The slurry slots 5 are in fluid communication with the interior space 3 so that slurry may flow from said interior space to said slurry slots 5.

The rotor 100 further comprises radially extending blades 6 that are arranged for separating the air slot 2 from adjacent slurry slots 5. The number of blades depends on the number of air slots 2 and slurry slots 5. In the embodiment shown in Figures, the number of blades is twelve.

In one embodiment, the cross-sectional shape of the slurry slot 5 is at least substantially triangular. This embodiment is especially preferably in smaller rotors. In one embodiment, the "smaller rotors" means rotors having diameter smaller than 1750 mm, even so small than 70 mm to 300 mm.

In one embodiment, the cross-sectional shape of the slurry slot 5 is at least substantially rectangular. This embodiment is especially preferably in larger rotors. In one embodiment, the "larger rotors" means rotors having diameter 1750 mm or more, such as 2200 mm or even more, up to 4000 mm or 5000 mm.

The cover disc 1 comprises at least one through-hole 7 extending from an upper surface 8 of the cover disc to at least one of the slurry slots 5. In one embodiment, such as shown in Figures, all the slurry slots 5 have a through-hole 7 of its own.

In one embodiment, some portion of the slurry slots 5 has the through-hole 7, whereas another portion of the slurry slots 5 is devoid of the through-holes 7. For instance, half of the slurry slots 5 has the through-hole 7, whereas another half does not have the through-hole.

Figure 3:
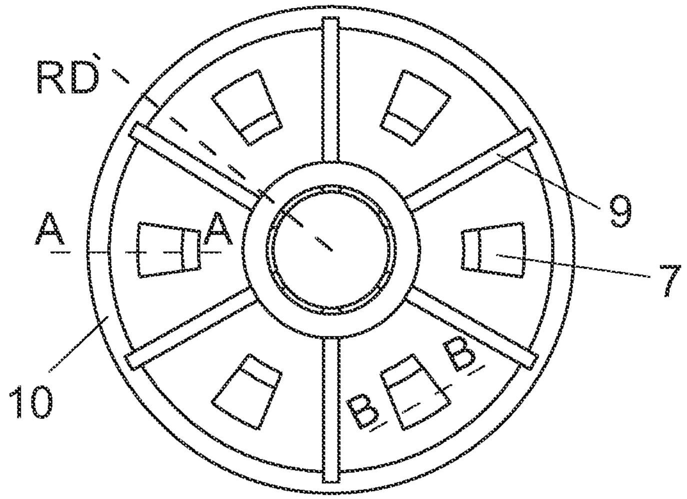
FIG. 3 is a schematic top view of another rotor.

In one embodiment, such as shown in FIG. 3, the outer circumference of upper surface 8 of the cover disc is provided with an outer ring 10 having a height extending away from said upper surface. The outer ring 10 frames and surrounds the upper surface 8. The outer ring 10 may have a constant or varying height. The outer ring may surround the upper surface in a continuous way, or it may be discontinuous comprising at least one section where the outer ring is missing, i.e. the height thereof is minimized to zero.

The shape of the through-hole 7 is selected based on needs of the current application.

In one embodiment, the basic shape of the through-hole 7 is polygon, such as triangle, quadrangle, or trapezoidal. Two adjacent corners of the polygon may be connected by a straight line or a curving line.

In one embodiment, the basic shape of the through-hole 7 is roundish, such as round, oval, or oviform.

In one embodiment, the basic shape of the through-hole 7 is a combination of polygon and roundish shapes.

In one embodiment, the cross-sectional area and shape of the through-hole 7 are constant or unchanging in all its length from the upper surface 8 to the slurry slot 5. In other embodiments, the cross-sectional area may vary. For example, the cross-sectional area may decrease from the upper surface 8 towards the slurry slot 5, or vice versa. In one embodiment, the cross-sectional area increases from the upper surface 8 towards the slurry slot 5, thus a suction effect may be created in the through-hole 7.

In one embodiment, the cross-section of the through-hole 7 at the upper surface 8 may have a first shape, and a second shape at the slurry slot 5, the first and the second shapes being different.

Figure 6:
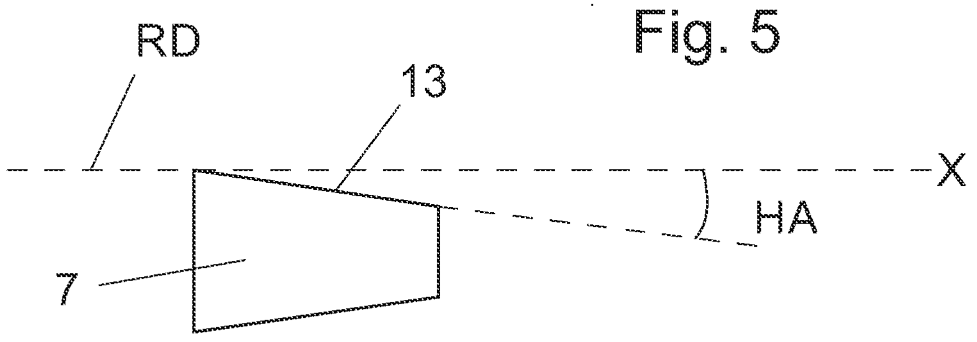
FIG. 6 is a schematic top view of a through-hole.

FIG. 6 is a schematic top view of a through-hole. In embodiments where the through-hole 7 is has a shape of polygon, the through-hole 7 may comprise at least one side edge 13 on the upper surface 8 of the cover disc that makes a hole angle HA with radial direction RD of the rotor. In one embodiment, said hole angle HA is in range of −10°-+45°. Positive values of the hole angle mean that the through-hole 7 is converging towards the centre axis X, whereas negative values means the through-hole is converging towards the outer circumference of the rotor.

In one embodiment, all the through-holes 7 have same shape and size. In another embodiment, there are at least two different shapes and/or sizes in the through-holes.

In one embodiment, such as shown in Figures, there is one through-hole 7 per one slurry slot 5. In another embodiment, there is two or even more through-holes connected to one slurry slot 5.

In one embodiment, the total area of the through-holes 7 in relation to the area of the cover disc 1 is in range of 2%-40%. In one embodiment, said relation is in range of 20%-30%.

In one embodiment, the area of the through-hole 7 in relation to the cross-sectional area of the corresponding slurry slot 5 is in range of 2%-40%. In one embodiment, said relation is in range of 20%-30%.

Figure 4:
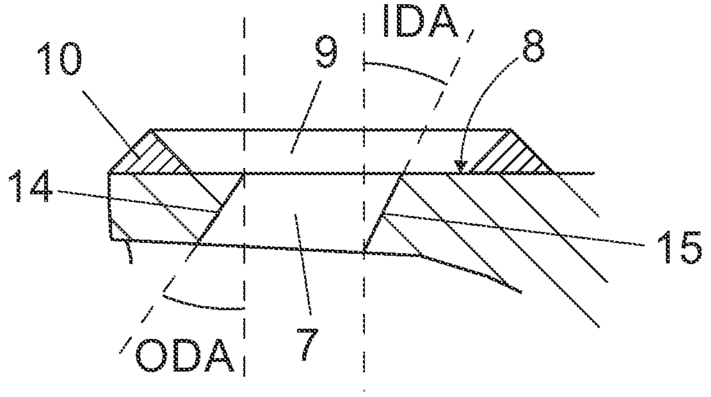
FIG. 4 is a schematic side view of a detail of the rotor shown in FIG. 3 in partial cross-section.

In one embodiment, such as shown in Figures, the through-hole 7 is aligned askew in relation to the upper surface 8 or the centre axis X. FIG. 4 is a schematic cross-sectional view of the embodiment shown in FIG. 3 along line A-A. The through-hole 7 comprises an outmost wall 14 that makes an outer diameter angle ODA and an innermost wall 15 that makes an inner diameter angle IDA with direction of the centre axis. In one embodiment, said angles are selected in range of −10°-+60°. Positive values mean that the respective wall 14, 15 is directed outwards when seeing from the upper surface 8, i.e. in direction of slurry flow FS through said through-hole. Negative values mean that the respective wall 14, 15 is directed inwards when seeing from the upper surface 8.

Figure 5:
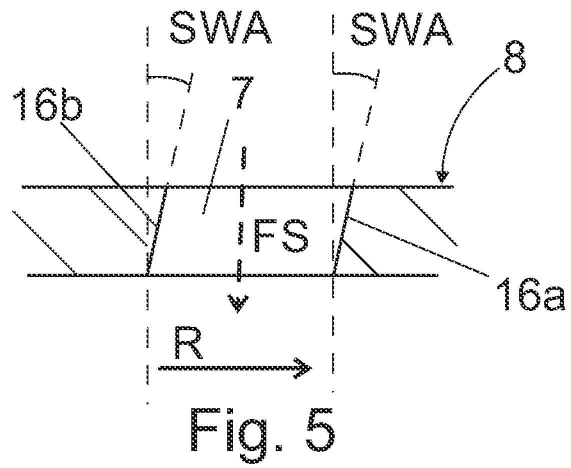
FIG. 5 is a schematic side view of a detail of a rotor in partial cross-section.

FIG. 5 is a schematic side view of a detail of the rotor shown in FIG. 3 along line B-B. In one embodiment, at least one of a leading side wall **16*a* and a trailing side wall 16*b*** of the through-hole makes a side wall angle SWA with direction of the centre axis so that said angle is in range of −20°-+60°. In one embodiment, said angle is in range of −10°-+60°. In one embodiment, said angle is in range of 0°-+30°.

The side wall angle SWA of the leading side wall **16*a* may be same as or differ from the SWA of the trailing side wall 16*b***.

Positive values of the side wall angle SWA mean that when the rotor is rotating in its rotating direction R, an intersection of the side wall **16*a*, 16*b* and the upper surface 8 precedes an intersection of said side wall and the underside of the cover disc 1**.

In one embodiment, the leading side wall **16*a* and the trailing side wall 16*b* are parallel with the centre axis X, i.e. the side wall angle SWA is 0°. This embodiment is especially advantageous if the rotor 100** is intended to rotate in both directions. This kind of bidirectional function of the rotor is advantageous in certain gas dispersion arrangements. However, it is to be noted that this kind of rotor, as well as any rotor described in the current disclosure, may also be used in unidirectional way. This means that the rotor is rotated just one direction in the gas dispersion arrangement.

Alignment of the through-holes 7 by choosing the outer diameter angle ODA, the inner diameter angle IDA, and the side wall angle SWA makes it is possible to optimize the slurry flow in the slurry slot and thereby create more effective rotors for the field of gas dispersion arrangements.

In one embodiment, the upper surface 8 of the cover disc is at least substantially even. However, in another embodiments, the upper surface 8 comprises three dimensional shapes, e.g. projections and/or recesses for e.g. guidance of flows on the upper surface.

In one embodiment, such as shown in Figures, the upper surface 8 comprises top blades 9. The top blades may be arranged at least mainly radially. In one embodiment, such as shown in Figures, each of the top blades 9 is radially arranged in relation to the cover disc 1. It is to be noted, however, that in some embodiments the direction of the blade(s) may diverge from the radial direction.

In one embodiment, there is at least one top blade 9 between each pair of through-holes 7. In the embodiment, such as shown in Figures, there is one top blade 9 between each pair of through-holes 7. Thus, the number of the top blades 9 is equal with the number of the through-holes 7.

In one embodiment, the number of the top blades 9 is less than the number of the through-holes 7. In another embodiment, the number of the top blades 9 is greater than the number of the through-holes 7.

In one embodiment, the length of the top blade 9 is selected in range from 0.5× the length of the corresponding through-hole 7 in radial direction on the upper surface 8 of the cover disc to a length equal to the radius of the upper surface.

In one embodiment, the height of the top blade in relation to the height H of the rotor measured from the bottom thereof to the underside of the cover disc 1 is selected in range of 1%-50%. In one embodiment, said range is 5%-30%. The height of the top blade 9 may be constant over all the length of the blade; alternatively, there may be variations in its height. In one embodiment, the height of the top blade 9 has its maximum near the centre axis X and from which it lowers towards the outer circumference of the rotor.

The shape of the top blade 9 is selected based on needs of the current application. By suitable shaping of the top blades, it is possible to control power consumption of the rotor as well as flow patterns of slurry. In one embodiment, such as shown in Figures, all the top blades 9 has same dimensions and shapes; however, this is not always necessary.

In one embodiment, the top blade 9 is straight.

In one embodiment, the top blade 9 is curved or comprises at least one curve.

In one embodiment, the shape of the top blade 9 is a combination of two or more straight sections and/or straight and curved sections.

In one embodiment, the top blade 9 is arranged perpendicularly in relation to the upper surface 8.

In one embodiment, the top blade 9 is arranged in relation to the upper surface 8 to an angle diverging from perpendicular angle, i.e. the top blade 9 may be inclined in relation to the upper surface, either in direction of rotation of the rotor or to another direction.

In one embodiment, such as shown in Figures, the top blade 9 extends to an outer edge of cover disc 1. However, this is not always necessary.

As mentioned earlier in this disclosure, the air channels 4 are connected to the air slot 2 for supplying air therein. In one embodiment, the bottom surface of the air channel 4 is inclined in relation to the plane P of the cover disc in an inclination angle IA that selected in range of 0°-60°, preferably 5°-30°. In one embodiment, the top surface of the air channel 4 is parallel with the bottom surface. In another embodiment, the top surface of the air channel 4 is not parallel with the bottom surface, i.e. it is deviating from the inclination angle IA. The inclination angle IA ensures that if some slurry gets in the air channel, it also comes back out from there.

The length of the air channel 4 is preferably as short as possible in order to minimize its susceptibility to clogging by slurry. In one embodiment, the length of the air channel in relation to the diameter (D) of the cover disc is selected in range of 10%-30%, preferably 20%.

The shape of the air slot 2 has preferably a curved shape without any points of discontinuity.

In one embodiment, the center air void 11 whereto the air channels 4 are in fluid communication has designed and dimensioned such that the cross sectional area of all the air channels 4 is at least substantially equal with the cross sectional area of an inlet receiving air in the rotor 100.

In one embodiment, air is supplied to the center air void 11 by a hollow rotor shaft (not shown).

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS

1 cover disc
2 air slot
3 interior space
4 air channel
5 slurry slot
6 blade
7 through-hole
8 upper surface
9 top blade
10 outer ring
11 center air void
13 side edge
14 outmost wall
15 innermost wall
16*a, b* side wall
100 rotor
D diameter of cover disc
FA air flow
FS slurry flow
H height
HA hole angle
IA inclination angle
IDA inner diameter angle
ODA outer diameter angle
P plane of cover disc
R direction of rotation
RD radial direction
SWA side wall angle
X centre axis

The invention claimed is:

1. A rotor of a gas dispersion arrangement, comprising:
a cover disc,
air slots arranged to protrude away from the cover disc, the air slots defining an interior space in an interior of the rotor,
an air channel connected to the air slots for supplying air to be dispensed in slurry,
slurry slots arranged between and alternating with the air slots around the interior space,
the slurry slots being in fluid communication with the interior space,
radially extending blades arranged for separating the air slots from adjacent slurry slots, wherein
the cover disc comprises at least one through-hole extending from an upper surface of the cover disc to at least one of the slurry slots, and
a total area of the at least one through-hole in relation to an area of the cover disc is in range of 2%-40%.

2. The rotor as claimed in claim 1, wherein
the at least one through-hole has a shape of a polygon.

3. The rotor as claimed in claim 2, wherein
the at least one through-hole comprises at least one side edge on the upper surface that makes a hole angle with a radial direction of the rotor, wherein said hole angle is in range of −10°-+45°.

4. The rotor as claimed in claim 1, wherein
the at least one through-hole has a round shape.

5. The rotor as claimed in claim 1, wherein
an outmost wall of the at least one through-hole makes an outer diameter angle with a direction of a center axis, wherein said outer diameter angle is in range of −10°-+60°.

6. The rotor as claimed in in claim 1, wherein
an innermost wall of the at least one through-hole makes an inner diameter angle with a direction of a center axis, wherein said inner diameter angle is in range of −10°-+60°.

7. The rotor as claimed in claim 1, wherein
at least one side wall of the at least one through-hole makes a side wall angle with a direction of a center axis, wherein said side wall angle is in range of −20°-+60°.

8. The rotor as claimed in claim 1, wherein
an area of the at least one through-hole in relation to a cross-sectional area of the corresponding slurry slot is in range of 2%-40%.

9. The rotor as claimed in claim 1, wherein
the upper surface of the cover disc is provided with an outer ring that has a height extending away from said upper surface.

10. The rotor as claimed in claim 1, wherein
a bottom surface of the air channel is inclined in relation to a plane of the cover disc in an inclination angle selected in range of 0°-60°.

11. The rotor as claimed in claim 1, wherein a length of the air channel in relation to a diameter of the cover disc is selected in range of 10%-30%.

12. The rotor as claimed in claim 1, wherein the at least one air slot has a curved shape without any points of discontinuity.

13. The rotor as claimed in claim 1, wherein the air channel is connected to a center air void for supplying air to said air channel, wherein the center air void is designed and dimensioned such that a cross sectional area of all the air channels is at least substantially equal with a cross sectional area of an inlet receiving air in the rotor.

14. The rotor as claimed in claim 1, wherein a cross-sectional shape of the slurry slot is either triangular or rectangular.

15. A rotor of a gas dispersion arrangement, comprising:

a cover disc, air slots arranged to protrude away from the cover disc, the air slots defining an interior space in an interior of the rotor, an air channel connected to the air slots for supplying air to be dispensed in slurry, slurry slots arranged between and alternating with the air slots around the interior space, the slurry slots being in fluid communication with the interior space, radially extending blades arranged for separating the air slots from adjacent slurry slots, wherein the cover disc comprises at least one through-hole extending from an upper surface of the cover disc to at least one of the slurry slots, and the upper surface of the cover disc comprises at least one top blade, arranged radially relative to the cover disc.

16. The rotor as claimed in claim 15, wherein a length of the at least one top blade is selected in range from 0.5× a length of the corresponding at least one through-hole in a radial direction on the upper surface of the cover disc to a length equal to the radius of the upper surface.

17. The rotor as claimed in claim 15, wherein a height of the at least one top blade in relation to a height of the rotor measured from a bottom thereof to the underside of the cover disc is selected in range of 1%-50%.

* * * * *